Dec. 11, 1934.                L. K. DAVIS                1,984,117
                              IMPACT DEVICE
                         Filed Jan. 2, 1932          2 Sheets-Sheet 1
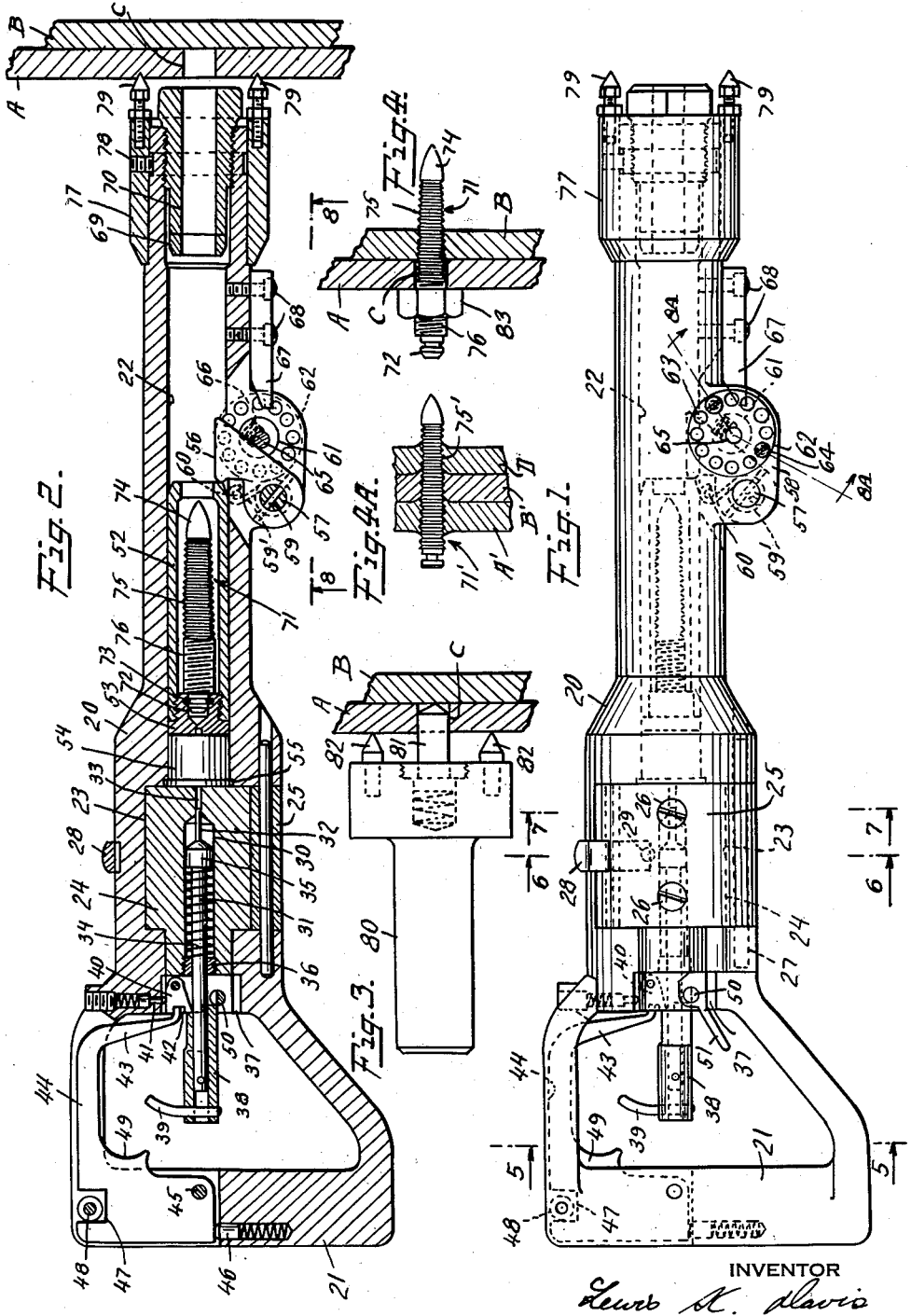

Dec. 11, 1934.  L. K. DAVIS  1,984,117
IMPACT DEVICE
Filed Jan. 2, 1932  2 Sheets-Sheet 2
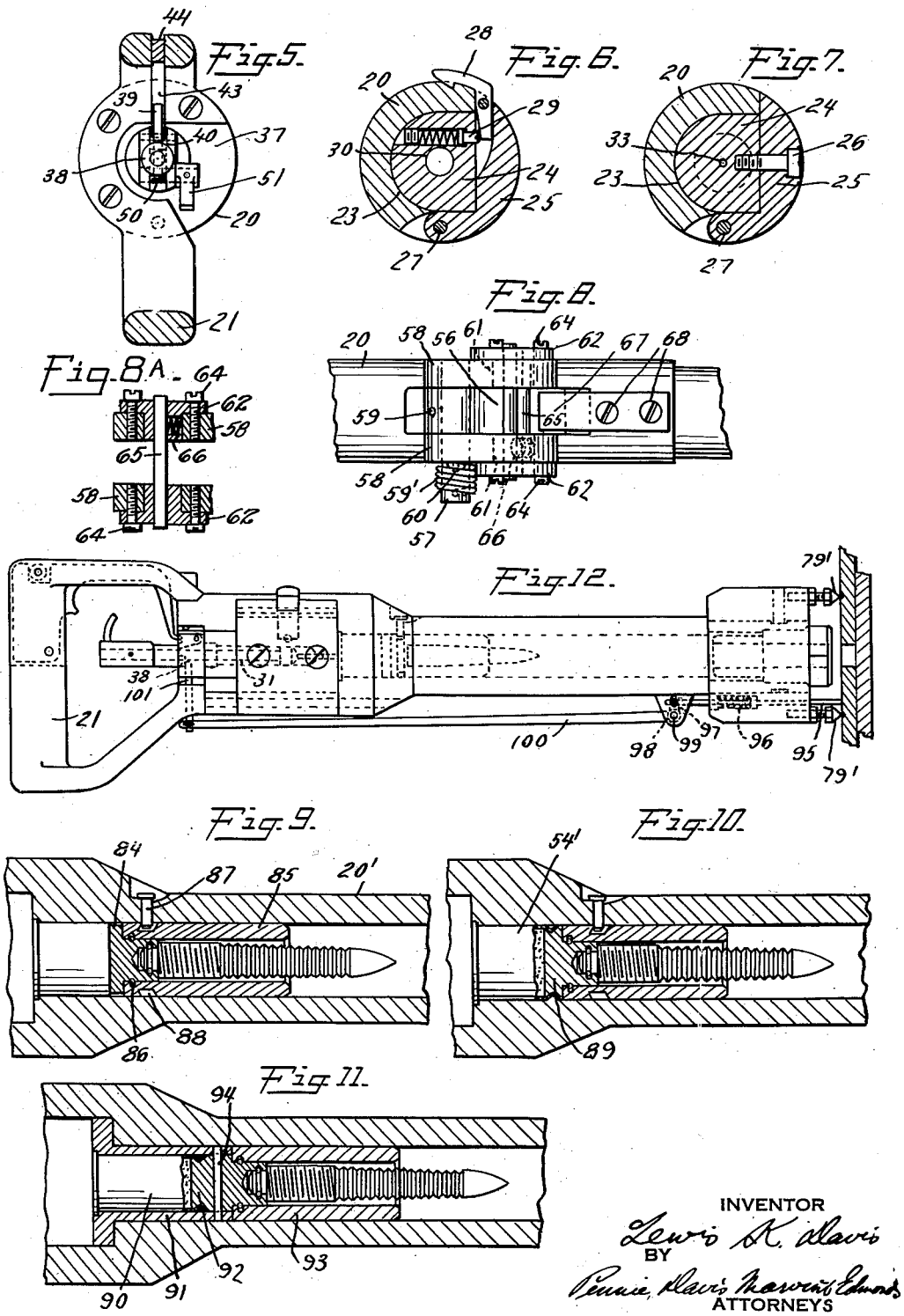

Patented Dec. 11, 1934

1,984,117

UNITED STATES PATENT OFFICE 1,984,117

IMPACT DEVICE

Lewis K. Davis, Hampton, N. J.

Application January 2, 1932, Serial No. 584,423

10 Claims. (Cl. 1—47)

This invention relates to impact tools and has particular reference to that type of tool with which a fastening member is driven by impact into an element to be fastened.

It is the usual practice to fasten elements together by means of fastening members such as screws, bolts, rivets, nails and the like, and especially in the case of fastening these elements together by bolts or rivets, holes must be punched or bored in the elements for the reception of the bolts or rivets. In fabricating structures such as the frames of buildings from structural steel, it is necessary that the steel beams, bars, girders, shapes or other elements be not only cut to proper size but they must also be provided with the accurately located bolt or rivet holes, so that it is only necessary to insert the bolts or drive the rivets and rivet them over. This riveting operation is usually done by electric or compressed air riveting hammers and, in order to operate these riveting hammers, it is necessary to provide them with a source of power, such as electricity or compressed air, the latter being usually provided by a portable motor-driven air compressor located on the job for supplying a reserve tank with compressed air from which the air lines lead to the individual riveting hammers. It is not always possible to provide the riveting hammers with a source of power, such as in inaccessible places or in outlying districts, and in many cases it is not feasible to provide a source of power for the riveting hammers, especially on small jobs.

Furthermore because of errors in the lay-out dimensions or error in punching, the bolt or rivet holes are sometimes not located in the proper places in the steel elements and they will not fit together properly. This requires drilling new bolt or rivet holes wherever possible, and frequently one or more of the steel elements must be replaced with elements in which the rivet holes have been properly punched. This results in considerable delay, waste and expense.

It is the principal object of this invention to provide a portable, self-contained tool, which permanently secures together two or more elements such as steel beams or the like with a fastening member, but without requiring that more than one of the elements be previously provided with holes for the fastening member, or the use of a separate source of power for emplacing the fastening member in the steel elements to be connected.

This object is obtained in a preferred embodiment of the invention, which comprises a readily handled frame having a cylinder through which a piston is forced by means of the expansion of a gas produced by highly combustible material, such as gun-powder, provided in the cylinder. A fastening member such as a steel barb is releasably carried by the piston and the initial movement of the piston in response to the expansion of the driving gas is retarded until all of the gun-powder constituting the driving charge is burned and the gases have reached their maximum power. This retarding means includes a detent engaging the piston and a shearable rod which is sheared off by the detent as the gas pressure on the piston reaches a predetermined maximum. This initial retardation of the piston secures a greatly increased power, as is explained in greater detail in copending application Serial No. 564,491, filed September 23, 1931 by the present applicant.

When the piston has been released by the shearing of the rod it is driven forward in the cylinder by the expanding gas until it engages an abutment, which arrests its movement suddenly. The means securing the fastening member to the piston is released by the momentum of the member when the piston carrying the member is suddenly stopped and the fastening member is accordingly driven through the elements against which the device is directed, whereby the elements are secured together. The charge of gun-powder may be replenished for the next fastening operation and is supplied in the form of a cartridge, any number of which may be carried for repeated fastening operations. Likewise other fastening members are provided for successive operations and a plurality of shear rods are provided for the same purpose.

The elements which are to be fastened together, such as steel beams for example, are prepared for the fastening process by providing the outer element with a hole, i. e. the element against which the impact tool is placed or directed is provided with a hole which exposes the web of the inner or other element, and the fastening member is driven in the manner described through the hole in the outer element and into or through the web of the inner element or elements. The fastening element is preferably threaded at one end for the reception of a nut, so that the element having the hole is secured to the element into which the element has been driven.

In order to properly align or center the tool with respect to the hole in the outer element, the latter is previously prick-punch-marked adjacent the hole and the impact tool is provided with pins adapted to seat in the prick-punch-marks and thus center the tool. A safety catch or latch is so arranged on the tool that it cannot be operated unless and until it is properly centered in the manner described.

It will be seen that the new impact tool of this invention provides a compact and convenient source of power for permanently securing together two or more elements without requiring aligned holes in the elements, heating of rivets, or an outside source of power. It may be accordingly used in localities where power is not readily obtainable or where the provision of power is not feasible or on small jobs or on jobs which are not accessible to the ordinary tools and equipment. Inasmuch as the fastening member is driven into all but one of the elements fastened together thereby, the member fits tighter than a rivet or bolt in these elements and the metal of these elements is upset and compacted around the member, so that loosening thereof is practically impossible and it is not necessary to rely on the skill and thoroughness of the operator as in the case of riveting or bolting.

For a better understanding of the invention, reference may be had to the accompanying drawings, in which Figure 1 is a side view of the new impact tool of this invention;

Fig. 2 is an axial section therethrough;

Fig. 3 illustrates a special implement for forming centering marks for the tool on one of the elements to be fastened together;

Figs. 4 and 4a illustrate the fastening member driven by the tool through the elements to be fastened together;

Figs. 5, 6 and 7 are cross-sections through the tool as seen along the lines 5—5, 6—6 and 7—7, respectively, of Fig. 1;

Fig. 8 is a view of the retarding mechanism as seen along the line 8—8 of Fig. 2;

Fig. 8a is a cross section through the retarding mechanism as seen along the line 8a—8a of Fig. 1;

Figs. 9, 10 and 11 are sectional views of modified forms of fastening member arrangements, and Fig. 12 illustrates a safety mechanism whose operation depends upon proper centering of the tool on the elements to be fastened together.

In these drawings numeral 20 designates the frame of the new impact tool of this invention and this frame is fitted at one end with a spade handle 21 adapted to be grasped by the operator in using the tool. The frame 20 is bored axially to provide the cylinder 22, and with the upper end of this cylinder 22 communicates a chamber 23 in which is removably mounted the block 24. This block 24 is shaped as shown in Figs. 2, 6 and 7 and is secured to a plate 25 by a pair of tap screws 26 and this plate is pivoted to the frame 20 by means of the pivot pin 27 whereby the block 24 may be swung into and out of the chamber 23 in the upper part of the frame 20. A latch 28, pivoted on the plate 25, is urged inwardly by the spring pressed pin 29 in the block 24 so that this latch 28 snaps into a notch in the outer surface of the frame 20 when the block 24 is swung home into its chamber 23 whereby the block 24 is locked securely in properly centered position in the frame 20.

The block 24 is provided with an axial bore 30 in which is slidably mounted the bolt 31 having at one end the firing pin 32 which slides through a small passage 33 communicating with the cylinder 22 of the frame 20. This bolt is normally urged to the right, as seen in Fig. 2, by means of the spring 34 surrounding the bolt and lying between the head 35 of the bolt and a sleeve 36 threaded in the opposite end of the bore 30 in the block 24. The bolt 31 projects through the outer end of the block 24 and into the opening of the spade handle 21 of the frame 20. A slot 37 (Figs. 2 and 7) is formed in the upper end of the frame 20 to permit access of the bolt 31 as the block 24 carrying it is swung about its pivot 27. The outer end of the bolt 34 carries the handle 38 having the finger hook 39 at its outer end. This handle 38 serves as a detent under which the latch 40 of the trigger mechanism is normally disposed so as to hold the firing pin 32 in a retracted position. This latch 40 is urged in its normal latching position by a spring pressed pin 41 slidable in a lateral hole in frame 20. The latch 40 is provided with a notch 42 in which is seated the trip tip 43 of the trigger 44. Trigger 44 is pivoted on pin 45 in a slot in the spade handle 21 and is normally held in inoperative position by a spring pressed pin 46 in the spade handle 21. The trigger is provided with a notch 47 in which lies a stud 48 on the spade handle 21 of the frame 20 so as to limit the movement of the trigger 44 in each direction. Trigger 44 is provided with a finger grip 49 which extends into the opening of the spade handle 21, whereas the remaining elements of the trigger 44, except for the trip tip 43, lie within the confines of the handle 21. Accordingly the trigger 44 can only be released when the operator of the tool positively actuates the finger grip 49 of the trigger 44. A safety catch or latch 50 pivoted in the block 24 and having a lever 51 may be set in the manner readily understood to lock the bolt 31 in retracted position, so that even if the trigger 44 is operated the bolt 34 will not be released.

Slidably mounted in the cylinder 22 of the frame 20 is a piston 52. This piston 52 is tubular in shape and the head 53 is removably threaded in the upper end thereof. Adapted to discharge against the head 53 of this piston 52 is a cartridge 54 containing a charge of gun-powder. The rim 55 of this cartridge 54 is seated in a recess at the upper end of the cylinder 22 and access to this cartridge 54 for removal and replacement may be had through the recess 23 of the frame when the block 24 is swung therefrom in a manner described.

The piston 52 is normally held in retracted position, i. e. with its head 53 in engagement with the cartridge 54, by means of a detent 56 carried by a pin 57 journalled in lugs 58 formed on the frame 20, as is shown especially in Figs. 2 and 8. The detent 56 is secured to the pin 57 by a pin 59 and is normally urged in a counter-clockwise direction against the free end of piston 52 by a coil spring 59' encircling pin 57 and secured thereto at one end by a pin 60 to the frame at its other end.

As illustrated particularly in Figs. 1, 2 and 8A, the lugs 58 on the frame 20 have aligned openings 61 and each carry a disc 62 having a hole eccentric with respect to the hole 61 in the lugs 58. These discs 62 may be set at various angular positions with respect to the corresponding lugs 58 and are provided with a plurality of spaced holes 63 through which may be passed the tap screw 64 in order to secure the discs 62 to the lugs 58 in any angularly adjusted position. Adapted to removably pass through the aligned holes in the disc 62 and the lugs 58 is a shear rod 65 which is adapted to engage the detent 56 and is held securely in position by a spring 66 in one of the lugs 58 of the frame 20 as indicated in Figs. 2 and 8. The purpose of the adjustable discs 62 having the eccentric holes with respect to the shear rod 65 is to secure the closest possible contact between the shear rod 65 and the detent 56. This shear rod 65 provides the initial retardation of the piston 52 until the entire charge of gun-powder in the cartridge 54 is burned and the maximum pressure of the generated powder gases is reached. At this time the shear rod 65 is sheared through by the detent 56, the edges of which cooperate with the inner surfaces of the lugs 58 to perform the shearing action. As explained in greater detail in the aforementioned co-pending application, the shear rods may be selected so that the retardation of the piston 52 may be governed at will, whereby it follows that any desired powder gas pressure within limits may be selected at will. Accordingly, shear rods 65 with various shearing resistances may be provided with the impact tool of this invention to secure various degrees of power. Also the density and character of the gunpowder in cartridge 54 may be selected to the same end, different charges of powder providing more or less power in a manner readily understood. The downward movement of the detent 56 after the rod 65 has been sheared is limited by a stop 67 secured by tap screws 68 to the frame 20.

Threaded in the muzzle or outward end of the frame 20 is a tubular abutment 69 having a passage 70 which is too small to admit passage of the piston 52, so that after the piston has been released by the detent 56 it engages the abutment 69 and cannot pass outwardly out of the cylinder 22 of the frame 20.

Carried within the piston 52 is the fastening member 71 having a stud 72 at one end which is secured in a recess in cylinder head 53 by a snap ring 73. The opposite end of the fastening member 71 is provided with a sharp tip or point 74 and the shank 75 thereof is roughened as by circular grooves formed on its surface. The head 76 of the fastening member 71 may be threaded for a purpose which will be described later.

The elements which are to be fastened together by the impact tool of this invention may be two structural steel beams or shapes, for example. The webs A and B of these two shapes (see Fig. 4) are placed together in the position in which they are intended to be fastened. The outer web A is provided with the hole C which exposes the surface of web B as is shown in Fig. 2. In order to properly center or align the bore 70 of the abutment 69 of the tool which the hole C in the web A, a sleeve 77, mounted on the recessed end of the frame 20 and locked thereto by the set screw 78, carries two or more spurs or prongs 79 which are threaded in the sleeve 77 for adjustment inwardly or outwardly. These spurs or prongs 79 may serve to steady and hold the tool on the element A by frictionally engaging the surface thereof but it is preferred that dents or impressions, preferably in the form of prick-punch-marks, be previously formed on the surface of element A in a definite relation to the hole C so that when the prongs or spurs 79 are inserted in these prick-punch-marks the tool is, as a matter of course, properly centered or aligned to the hole C. In order to form these prick-punch-marks on the web A a special implement or tool is preferably provided. This implement is shown in Fig. 3 and comprises a block 80 having a spring pressed centering pin 81 in one end, of a dimension substantially equivalent to the hole C so that this pin 81 may be inserted therein. Located on block 80 on either side of the centering pin 81 are the spurs or prongs 82 which correspond to the spurs or prongs 79 on the tool and are located on the block 80 in exactly the location that the spurs or prongs 79 are located on the tool. When the pin 81 of the block 80 is inserted in the hole C of the element A and the block 80 is struck with a hammer or the like, the spurs or prongs 82 will form fairly deep prick-punch-marks in the surface of element 80 for the reception of the prongs or spurs 79 of the tool.

In operating the new impact tool of this invention the bolt 31 is retracted by pulling upwardly on the finger hook 39 thereof until latch 40 of the trigger mechanism catches under the inner end of handle 38 to hold the bolt 31 in its retracted position. It is also preferred that the handle 51 of the safety catch or latch 50 be also operated to prevent accidental firing of the cartridge 54. Then the latch 28 is released from the corresponding notch in frame 20 and the entire block 24 swung about its pivot 26 out of the chamber 23 in the frame 20. The trigger tip 43 which engages in notch 42 of the latch 40 does not interfere with the movement of the block 24 about its pivot 27 even though this trigger tip 43 is stationary relatively to the block 24. This is arranged by the fact that the notch 42 in the latch 40 extends transversely thereof so that the trigger tip 43 may move freely into and out of this notch when the block 24 is moved.

With the block 24 thrown out of its chamber 23 the cylinder 22 of the frame 20 is exposed. In the open end of this cylinder the piston 52 and the cartridge 54 may be inserted. Then the block 24 may be swung back into position and the latch 28 will automatically snap into the corresponding notch on the frame 20 to hold the block in fixed position such that the firing pin 32 of the bolt 31 is aligned with the detonating cap of the cartridge. The piston 52 is held against the cartridge 54 by the detent 56 which in turn is held up by its spring 59 and the shear rod 65 which is placed in position in the manner described. The surface of the element A which is to be fastened to element B is provided with the prick-punch-marks adjacent the hole C by means of the implement illustrated in Fig. 3. Then the operator grasps the impact tool by the space handle 21 and places the end thereof against the web A so that the prongs or spurs 79 thereof fit into the corresponding prick-punch-marks in the surface of the web A. When the tool is so placed the operator is assured that bore 70 of the abutment 59 is properly centered and aligned with respect to the hole C in the web A. Then the operator releases the safety catch 50 by manipulating handle 51 and presses on finger grip 49 of trigger 44. This moves trigger 44 about its pivot 45 and causes tip 43 to withdraw latch 40 out of contact with the bolt 31 so that the spring 34 thereof drives the firing pin 32 into contact with the detonating cap of cartridge 54. The rapidly expanding gases of combustion of the powder in cartridge 54 tend to drive the piston 52 instantly but the piston is retarded by the detent 56 which is held in place by the shear rod 65. However, when the gas pressure has built up to a sufficient point, the detent 56 shears off the shear rod 65 and the piston 52 is suddenly released. Retardation of the piston by the shear rod 65 enables the powder to burn completely so that the gases of combustion have full time to exert their greatest force before being released. The piston 52, after being released, is driven through the cylinder 22 until it contacts with the abutment 69 whereupon its movement is suddenly arrested. The momentum of the fastening member 71 causes the snap ring 73 to be released so that the fastening member is projected through the piston 52, the bore 70 of abutment 69, and into hole C of element A. The tip or point 74 of the fastening member 71 pierces element B and passes partly through it until the force of the fastening member is dissipated. The metal of the element B is in close contact with the roughened surface of the shank 75 of the member 71 so that it is securely held in place. Then the nut 83 is screwed down on the threaded head 76 of the fastening member 71 to clamp the element A against the element B.

It will be seen that the new impact tool of this invention provides a very compact and convenient machine for permanently fastening two or more elements together without requiring the use of aligned holes or special sources of power.

Various modifications of the arrangement of the fastening member in the piston and the shear rods are illustrated in Figs. 9 to 11 inclusive. In Fig. 9 the head 84 of the piston 85 is secured thereto by a snap ring 86 instead of the threaded connection shown in Fig. 2. Also the shear rod is a pin 87 inserted through an opening in the frame 20' and engaging in an annular slot 88 in the outer surface of the piston 85. This slot is so shaped that the upper edge thereof resembles a knife blade for shearing off the end of the shear pin 87. This is a somewhat simpler arrangement than that shown in Fig. 2 in that the shear pin 87 directly contacts with the piston 85 instead of through the intermediary of a detent as in Fig. 2.

In Fig. 10 there is shown the same arrangement except that the end of the cartridge 54' is crimped around the cylinder head 89 which is grooved for that purpose.

In Fig. 11 the cartridge 90 is carried in a separate clip 91 and is crimped around the head 92 of the piston 93. The cartridge clip 90 is secured to the piston head 92 by the shear pin 94 so that the piston 93 and the cartridge clip 91 constitute a single unit which may be placed in the tool before performing the fastening operation described.

In order to insure that the impact tool is properly centered with respect to the hole C in the element A there is provided a safety device which prevents firing of the tool until and unless it is properly centered in the manner described. Such an arrangement is shown in Fig. 12 in which a plunger or feeler 95 is slidably mounted in the tool and projects slightly beyond the tip of the spur or prong 79'. This plunger is urged outwardly by a coil spring 96 and is pivoted at its inner end to the short arm 97 of the bell crank lever 98 which is pivoted to the frame at 99. The long arm 100 of the bell crank lever 98 is connected to a safety lock pin 101 which is normally seated under the handle 38 of the firing mechanism bolt 31 in place of the safety catch 50 shown in Fig. 2. Thus the tool is always locked against firing when not in use. When, however, the tool is properly centered so that the prong or spur 79' enters the prick-punch-mark on the surface of element A, the feeler 95 engaging the surface of element A is moved inwardly to rock bell crank lever 98 around its pivot 99 and withdraw locking pin 101 from the bolt 31 so that the latter may be fired. It will be understood that the rod 100 is fastened to the pivot 99 and rocks with the lever 98, thus causing retraction of the pin 101. If the spur or prong 79' is not properly inserted in the prick-punch-mark the feeler 95 will not be moved as far and the locking pin 101 will not disengage the bolt 31 so that it cannot be fired. It will be seen that, although the insertion of the spur or prong 79' in the prick-punch-mark results in only a small movement of the feeler 95, this movement is considerably multiplied by long arm 100 of the bell crank 98 to produce a sufficient movement of the locking pin 101. Although only one of these safety mechanisms is shown it is preferred that one feeler 95 be provided for every one of the prongs or spurs 79' so that each of the spurs or prongs 79' must be inserted in its corresponding prick-punch-mark before the tool can be operated.

In many instances it will not be necessary to provide the hole C in the outer element A of the elements which are to be fastened together, and in such case the rear end 76 of the fastening member 71 need not necessarily be threaded nor will the nut be required. Instead, as shown in Fig. 4a, the shank 75' of the fastening member 71' is roughened by the circular ribs substantially along its entire length, and may be driven directly through two or more elements to be fastened together. In Fig. 4a, three elements A', B' and D are shown fastened together by the member 71', the metal of these elements being upset and in close contact with the member somewhat in the manner illustrated and neither of them being initially provided with the pilot hole C shown in Fig. 4.

I claim:

1. In an impact tool, the combination of a frame, a piston movable therein for carrying a fastening member, means for receiving a charge of combustible material for generating a gas to actuate said piston, and means for supporting a member for initially retarding said piston whereby said member is shearable transversely by movement of said piston.

2. In an impact tool, the combination of a frame, a piston movable therein for carrying a fastening member, means for receiving a charge of combustible material for generating a gas to actuate said piston, a detent engaging the piston, and means for supporting a rod whereby the same is shearable by said detent in response to movement of said piston.

3. In an impact tool, the combination of a frame, a piston movable therein for carrying a fastening member, means for receiving a charge of combustible material for generating a gas to actuate said piston, means for supporting a member shearable by movement of the piston, whereby said member may initially retard movement of said piston, and an abutment on the frame for finally stopping said piston.

4. In an impact tool, the combination of a frame, a piston movable therein for carrying a fastening member, means for receiving a charge of combustible material for generating a gas to actuate said piston, a detent engaging the piston, means for supporting a rod shearable by said detent in response to movement of the piston, and an abutment on the frame for initially stopping said piston.

5. In an impact tool, the combination of a frame, a piston movable therein for carrying a fastening member, means for receiving a charge of combustible material for generating a gas to actuate said piston, a detent pivoted on the frame and engaging the piston, and means for supporting a rod between the frame and the detent, whereby the rod is shearable by the latter in response to movement of the piston.

6. In an impact tool, the combination of a frame, a piston movable therein for carrying a fastening member, means for receiving a charge of combustible material for generating a gas to actuate said piston, a detent pivoted on the frame and engaging the piston, means for supporting a rod between the frame and the detent, whereby the rod is shearable by the detent in response to movement of the piston, and an abutment on the frame spaced from the piston for stopping the latter.

7. In an impact tool, the combination of a frame having a cylinder, a tubular piston movable in the cylinder for releasably carrying the fastening member, means for receiving a cartridge of gun-powder in the frame to be discharged into the cylinder against the head of the piston, a firing mechanism on the frame for detonating the cartridge, a detent on the frame engaging the piston, means on the frame for supporting a rod shearable by the detent in response to movement of the piston, and an abutment on the frame spaced from the piston for stopping the movement thereof.

8. In an impact tool, the combination of a frame, a piston movable therein for releasably carrying a fastening member, means for receiving a charge of combustible material for generating a gas to actuate said piston, and a removable head for said piston.

9. In an impact tool, the combination of a frame, a piston movable therein for carrying a fastening member, means for receiving a charge of combustible material for generating a gas to actuate said piston, and a releasable resilient connection between said piston and the member carried thereby.

10. In an impact tool, the combination of a frame for receiving a fastening member and adapted to be driven into an element having a surface depression, means for receiving a cartridge of gun-powder in the frame for driving the fastening member into the element when detonated, firing mechanism on the frame for detonating the cartridge, a member on the frame displaced from the axis of movement of the element for engaging the depression on the element for centering the frame, a locking means for the firing mechanism, and connections between said member and said locking means for locking the firing mechanism when the member is not properly engaged with the depression on the element, and vice versa.

LEWIS K. DAVIS.